United States Patent
Adragna et al.

(10) Patent No.: US 11,622,429 B1
(45) Date of Patent: Apr. 4, 2023

(54) QR-OPERATED SWITCHING CONVERTER CURRENT DRIVER

(71) Applicant: STMicroelectronics S.r.l., Agrate Brianza (IT)

(72) Inventors: Claudio Adragna, Monza (IT); Giovanni Gritti, Bergamo (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 17/487,966

(22) Filed: Sep. 28, 2021

(51) Int. Cl.
    *H05B 45/375* (2020.01)

(52) U.S. Cl.
    CPC .................. *H05B 45/375* (2020.01)

(58) Field of Classification Search
    CPC ..... Y02B 70/10; Y02B 20/30; H02M 1/4225; H02M 3/33507; H02M 1/0058; H02M 1/0009; H02M 1/0025; H02M 1/08; H02M 1/4258; H02M 3/156; H02M 3/33523; H02M 1/0022; H02M 1/12; H02M 1/42; H02M 3/157; H02M 1/0016; H02M 1/0048; H02M 1/0064; H02M 1/36; H02M 1/4241; H02M 3/335; H02M 3/33515; H02M 1/0032; H02M 1/0054; H02M 1/007; H02M 1/083; H02M 1/15; H02M 1/32; H02M 1/4208; H02M 3/1582; H02M 3/1584; H02M 3/315; H05B 45/385; H05B 45/10; H05B 45/375; H05B 47/10
    See application file for complete search history.

(56) References Cited

U.S. PATENT DOCUMENTS

| 6,842,353 | B2 | 1/2005 | Yamada et al. |
| 7,042,743 | B2 | 5/2006 | Pidutti et al. |
| 7,848,126 | B2 | 12/2010 | Hartlieb et al. |
| 8,194,420 | B2 | 6/2012 | Tumminaro et al. |
| 8,270,190 | B2 | 9/2012 | Adragna |
| 8,305,004 | B2 | 11/2012 | Shao |

(Continued)

OTHER PUBLICATIONS

Adragna, Claudio, "Design-Oriented Small-Signal Modeling of Primary-Side Regulated Flyback Converters," Power Conversion Applications Laboratory, STMicroelectronics s.r.l., 2018, 8 pages.
(Continued)

*Primary Examiner* — Abdullah A Riyami
*Assistant Examiner* — Syed M Kaiser
(74) *Attorney, Agent, or Firm* — Slater Matsil, LLP (57) ABSTRACT

In an embodiment, a control circuit includes: an output terminal configured to be coupled to a control terminal of a transistor that is coupled to an inductor; a logic circuit configured to control the transistor using a first signal; a zero crossing detection circuit configured to generate a freewheeling signal indicative of a demagnetization of the inductor; a comparator having first and second inputs configured to receive a sense voltage indicative of a current flowing through the transistor and a reference voltage, respectively, and an output configured to cause the logic circuit to deassert the first signal; and a reference generator configured to generate the reference voltage and including: a current generator, a capacitor and a resistor coupled to the output of the reference generator, and a switch coupled in series with the resistor and configured to be controlled based on the first signal and the freewheeling signal.

20 Claims, 7 Drawing Sheets

(56) References Cited

U.S. PATENT DOCUMENTS

| | | |
|---|---|---|
| 8,467,209 B2 | 6/2013 | Adragna |
| 9,018,855 B2 | 4/2015 | Chen |
| 9,042,127 B2 | 5/2015 | Gong |
| 9,271,366 B2 | 2/2016 | Yu et al. |
| 9,423,808 B2 | 8/2016 | Tateishi et al. |
| 9,660,542 B2 | 5/2017 | Schaemann et al. |
| 9,699,838 B2 | 7/2017 | Xu |
| 9,699,840 B2 | 7/2017 | Xu et al. |
| 9,755,511 B2 | 9/2017 | Lee et al. |
| 9,800,148 B2 | 10/2017 | Gritti et al. |
| 9,913,329 B2 | 3/2018 | Gritti |
| 10,128,761 B2 | 11/2018 | Gritti et al. |
| 10,236,774 B2 | 3/2019 | Gritti |
| 10,241,322 B2 | 3/2019 | Gritti et al. |
| 10,284,096 B2 | 5/2019 | Gritti |
| 10,298,116 B2 | 5/2019 | Gritti et al. |
| 10,461,658 B2 | 10/2019 | Adragna |
| 11,005,361 B2 | 5/2021 | Scappatura et al. |
| 11,374,483 B2 | 6/2022 | Kazama et al. |
| 11,374,484 B2 | 6/2022 | Liang et al. |
| 2008/0180075 A1 | 7/2008 | Xie et al. |
| 2008/0259656 A1 | 10/2008 | Grant |
| 2009/0086513 A1 | 4/2009 | Lombardo et al. |
| 2009/0257257 A1* | 10/2009 | Adragna ............ H02M 3/1584 363/65 |
| 2009/0316454 A1 | 12/2009 | Colbeck et al. |
| 2010/0321956 A1 | 12/2010 | Yeh |
| 2011/0018516 A1 | 1/2011 | Notman et al. |
| 2012/0026765 A1 | 2/2012 | Adragna |
| 2012/0026766 A1 | 2/2012 | Adragna |
| 2014/0029316 A1 | 1/2014 | Adragna |
| 2014/0097808 A1 | 4/2014 | Clark et al. |
| 2016/0172981 A1 | 6/2016 | Gritti et al. |
| 2016/0248323 A1 | 8/2016 | Gritti et al. |
| 2016/0255685 A1* | 9/2016 | Melanson ............ H05B 45/50 327/109 |
| 2016/0261199 A1 | 9/2016 | Adragna et al. |
| 2016/0336861 A1 | 11/2016 | Gritti |
| 2017/0019030 A1 | 1/2017 | Sugawara |
| 2017/0271979 A1* | 9/2017 | McDougle ......... H02M 1/4258 |
| 2018/0007751 A1* | 1/2018 | Gritti .................... H02M 1/08 |
| 2018/0035500 A1* | 2/2018 | Song .................... H05B 45/14 |
| 2018/0375434 A1 | 12/2018 | Biziitu et al. |
| 2020/0144923 A1 | 5/2020 | Cohen |
| 2020/0158766 A1 | 5/2020 | Nate et al. |
| 2020/0321855 A1 | 10/2020 | Gritti |
| 2020/0395843 A1* | 12/2020 | Hiasa .................... H02M 1/08 |
| 2021/0099073 A1 | 4/2021 | Hrinya et al. |
| 2021/0105875 A1 | 4/2021 | Lyu |
| 2022/0034946 A1 | 2/2022 | Nate et al. |
| 2022/0109366 A1* | 4/2022 | Maejima ............ H05B 45/382 |

OTHER PUBLICATIONS

Hwu, Kuo-Ing et al., "Light-Emitting Diode Driver with Low-Frequency Ripple Suppressed and Dimming Efficiency Improved," IET Power Electron., vol. 7, Iss. 1, 2014, 9 pages.

Jane, Gwan-Chi et al., "Dimmable Light-Emitting Diode Driver with Cascaded Current Regulator and Voltage Source," IET Power Electronics, vol. 8, Iss. 7, Mar. 4, 2015, 7 pages.

SGS-Thomson Microelectronics, "UC3842 Provides Low-Cost Current-Mode Control," Application Note, 1995, 16 pages.

Shao, Jianwen, "Single Stage Offline LED Driver," STMicroelectronics, 2009, 5 pages.

STMicroelectronics, "Off-Line All-Primary-Sensing Switching Regulator," ALTAIR04-900, DocID18211 Rev 3, Oct. 2014, 29 pages.

Wu, Stockton, "Single-Stage High Power Factor Flyback for LED Lighting," RICHTEK, AN012, May 2014, 13 pages.

\* cited by examiner

QR-OPERATED SWITCHING CONVERTER CURRENT DRIVER

CROSS-REFERENCE TO RELATED APPLICATIONS

This application is related to U.S. patent application Ser. No. 17/487,944, filed on the same day as this application, entitled "Average Current Control Circuit and Method," and to U.S. patent application Ser. No. 17/487,999, filed on the same day as this application, entitled "Average Current Control Circuit and Method," which applications are hereby incorporated herein by reference.

TECHNICAL FIELD

The present disclosure relates generally to an electronic system and method, and, in particular embodiments, to a quasi-resonant (QR)-operated switching converter current driver.

BACKGROUND

A light emitting diode (LED) driver is configured to provide sufficient current to light the LED. A switching voltage regulator may be used to drive a LED.

The intensity of light produced by the LED is related to the average current flowing through the LED. Generally, the higher the average current flowing through the LED, the higher the intensity of light produced by the LED. Thus, it is generally desirable to use a current driver for driving the LED, to accurately control the average current flowing through the LED.

Dimming of a LED is possible by controlling the average current flowing through the LED. For example, reducing the intensity of light produced by the LED may be achieved by reducing the average current flowing through the LED.

Fluctuations in the average current flowing through the LED may cause fluctuations in the light emitted by the LED. Thus, a switching converter current driver may be used to properly drive a LED by switching at a frequency higher than the flicker fusion threshold.

LED lamp drivers are often specified for a rated output current (sometimes programmable in a range by a user) and for a range of output voltages to power different types/ lengths of LED string. Notably, the rated output current is normally specified with quite tight accuracy, often less than 5% overall.

It is also common for LED lamp drivers to provide dimming capability, i.e., the ability to reduce the LED current from the rated value down to low values (sometimes lower than 1%) to enable the user to lower the intensity of the light output of the LED string. It is generally desirable for the LED current reduction and the resulting light modulation to be seamless and flicker-free.

SUMMARY

In accordance with an embodiment, a control circuit includes: an output terminal configured to be coupled to a control terminal of a first transistor that has a current path coupled to an inductor; a first logic circuit having an output coupled to the output terminal and configured to control the first transistor using a first signal; a zero crossing detection circuit having a demagnetization sensing input configured to be coupled to the inductor, and a first output coupled to a first input of the first logic circuit, where the zero crossing detection circuit is configured to: generate a freewheeling signal indicative of a demagnetization of the inductor based on the demagnetization sensing input, and cause, with the first output of the zero crossing detection circuit, the first logic circuit to assert the first signal to turn on the first transistor based on the demagnetization sensing input; a first comparator having a first input configured to receive a sense voltage indicative of a current flowing through the current path of the first transistor, a second input configured to receive a first reference voltage, and an output coupled to a second input of the first logic circuit and configured to cause the first logic circuit to deassert the first signal to turn off the first transistor when the sense voltage becomes higher than the first reference voltage; and a reference generator having an output coupled to the second input of the first comparator and configured to generate the first reference voltage at the output of the reference generator, the reference generator including: a first current generator configured to generate a first current, a first capacitor coupled to the output of the reference generator and to the first current generator, a first resistor coupled to the output of the reference generator, and a first switch coupled in series with the first resistor, the first switch configured to be controlled based on the first signal and the freewheeling signal.

In accordance with an embodiment, a method for regulating an average output current flowing through an inductor includes: generating a demagnetization signal with an interface circuit having an input coupled to a first intermediate node that is coupled between a current path of a power transistor and the inductor; generating a freewheeling signal indicative of a demagnetization of the inductor based on the demagnetization signal; generating a first signal based on the demagnetization signal; turning on the power transistor at a valley of the demagnetization signal occurring after the freewheeling signal is deasserted by using the first signal; receiving a sense voltage indicative of a current flowing through the current path of the power transistor; generating a first reference voltage at a second intermediate node by: generating a first current with a first current generator that is coupled to the second intermediate node, the second intermediate node coupled to a first capacitor and to a first resistor; closing a first switch that is coupled in series with the first resistor when the first signal or the freewheeling signal is asserted, and opening the first switch when the first signal and the freewheeling signal are deasserted; and turning off the power transistor when the sense voltage becomes higher than the first reference voltage, where regulating the average output current includes regulating the average output current based on the first current.

In accordance with an embodiment, a switching converter including: a first supply terminal configured to receive a first voltage; a second supply terminal configured to receive a second voltage lower than the first voltage; a power transistor having a current path coupled between the first and second supply terminals; a sense resistor coupled between the current path of the power transistor and the second supply terminal; an inductor coupled to between the current path of the power transistor and the first supply terminal; a freewheeling diode coupled between the inductor and the first supply terminal; a driver having an output coupled to a control terminal of the power transistor; a flip-flop having a first output coupled to an input of the driver, where the flip-flop is configured to produce a first signal at the first output of the flip-flop; a zero crossing detection circuit having a demagnetization sensing input coupled to the current path of the power transistor and to the inductor, where the zero crossing detection circuit is configured to:

generate a freewheeling signal based on a demagnetization of the inductor, and cause the flip-flop to assert the first signal to turn on the power transistor based on the demagnetization sensing input; a first comparator having a first input configured to receive a sense voltage indicative of a current flowing through the current path of the power transistor, a second input configured to receive a first reference voltage, and an output configured to cause the flip-flop to deassert the first signal to turn off the power transistor when the sense voltage becomes higher than the first reference voltage; and a reference generator configured to generate the first reference voltage, the reference generator including: a first current generator configured to generate a first current, a first capacitor coupled to the output of the reference generator and to the first current generator, a first resistor coupled to the output of the reference generator, and a first switch coupled in series with the first resistor, the first switch configured to be controlled based on the first signal and the freewheeling signal, where an average output current flowing through the inductor is proportional to the first current.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a QR-operated buck switching LED driver (constant current source), e.g., for use in solid-state lighting (SSL), such as for driving one or more LEDs as the load. In some embodiments, the load may not include a LED. Some embodiments may be implemented in applications different from SSL, such as industrial, consumer, ICT, white goods, etc., "as is," or with small adaptations. Some embodiments may be used in topologies different from a buck converter, such as a boost or buck-boost converters, e.g., with small adaptations.

In an embodiment of the present invention, the average inductor current of a QR operated buck converter is regulated by sensing only the current flowing through a power transistor, where the regulated current is independent of the switching frequency of the buck converter. Some embodiments are based on a peak current mode control core. In some embodiments, a valley skipping circuit limits the maximum switching frequency of the buck converter with a nominally unaltered control scheme, with good accuracy of average output current regulation during analog dimming. In some embodiments, a voltage feedforward circuit compensates propagation delays making the regulated output current little sensitive to input and output voltage variations.

Figure 1:
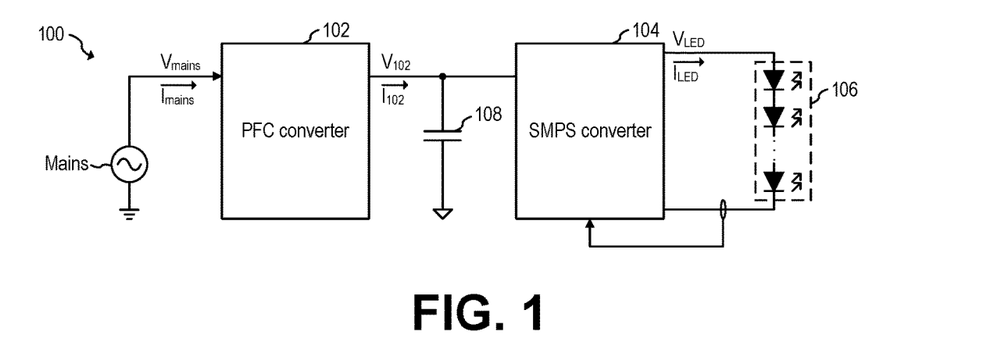
FIG. 1 shows a LED lamp driver, according to an embodiment of the present invention.

FIG. 1 shows LED lamp driver 100, according to an embodiment of the present invention. LED lamp driver 100 includes switched-mode power supply (SMPS) 102, and SMPS 104 for driving LED string 106. Switching converter 102 provides a regulated DC output voltage $V_{102}$ across energy storage capacitor 108 that supplies power to cascaded converter 104. Converter 104 provides a regulated output current that powers LED string 106.

In some embodiments, switching converter 102 may be implemented as a power factor corrector (PFC) front-end converter, which may draw a sinusoidal current $I_{mains}$ from the power line, in-phase with the sinusoidal line voltage $V_{mains}$ (e.g., 60 Hz, 110 $V_{rms}$; 50 Hz, 220 $V_{rms}$) may be used. Using a PFC front-end converter may advantageously achieve high power factor and low distortion of the input current. In some embodiments, using implementing switching converter 102 with PFC may advantageously help keep harmonic emissions low, which may advantageously help comply with standards such as the IEC61000-3-2, which sets class C harmonic emission limits for applications such as LED lamp drivers. In some embodiments, implementing converter 102 with PFC advantageously help keep total harmonic distortion (THD) of the input current $I_{mains}$ low.

AC/DC switching converter 102 may introduce ripple in the output current $I_{102}$. For example, current $I_{102}$ may exhibit a ripple with a high frequency component at the switching frequency of converter 102 (typically above 50 kHz), and a low-frequency component at twice the frequency of the AC power line (due to the pulsating nature of the power converter 102 draws from the power line and deliver to its output). The low-frequency ripple, if provided to LED string 106, may cause a reduction of the average LED current $I_{LED}$ for a given peak value, and may cause an increase in the operating temperature of the LEDs of LED string 106, which may shorten the lifetime of the LEDs of LED string 106. Such low-frequency ripple may also cause light fluctuations (flicker and shimmer), which may be undesirable if perceptible, and which have been reported to cause health problems even when imperceptible.

The PFC output voltage $V_{102}$ may be affected by a low-frequency ripple, generated by the low-frequency component of the output current $I_{102}$ ripple. Generally, converter 102 regulates the DC value of the output voltage $V_{102}$ by a low-bandwidth control loop to achieve high power factor and low distortion of the input current, but may be unable to reject the low-frequency output ripple.

In some embodiments, using a two-stage power conversion, such as shown in FIG. 1 (with front-end PFC converter 102 supply power to capacitor 108, and a cascaded post-regulator converter 104 supplying a regulated current to LED string 106) advantageously help prevent LED string 106 from being exposed to the ripple at the output of PFC converter 102. For example, in some embodiments, converter 104 provides a DC constant current $I_{LED}$, regulated by a wide-bandwidth control loop able to reject the low-frequency input voltage ripple, which advantageously optimizes the usage of LED string 106 and provides flicker-free operation of LED string 106.

In some embodiments, converter 102 may be implemented as a boost converter and converter 104 may be implemented as a buck converter. For example, in some embodiments delivering less than 100 W of power to LED string 106, voltage $V_{102}$ may be, e.g., between 100 V and 400 V, and converter 104 provides voltage $V_{LED}$ at a level that is appropriate for LED string 106, such as between 30 V and 60 V. In some embodiments, implementing converter 102 as a boost and converter 104 as a buck may advantageously keep current $I_{102}$ (and the relevant low-frequency ripple) low and may advantageously allow for implementing capacitor 108 without using a bulky, large value energy storage capacitor. Implementing converter 102 and 104 as a boost and buck converters, respectively, may also advantageously help in complying with safety extra low voltage (SELV) requirements, which limits $V_{LED}$ to 60 V.

In some embodiments, converter 102 may be implemented as a flyback converter, which may advantageously provide isolation from mains. Isolation from mains may advantageously help comply with electrical safety standards, such as IEC60950, IEC62368, IEC61347-1, for example.

Figure 2:
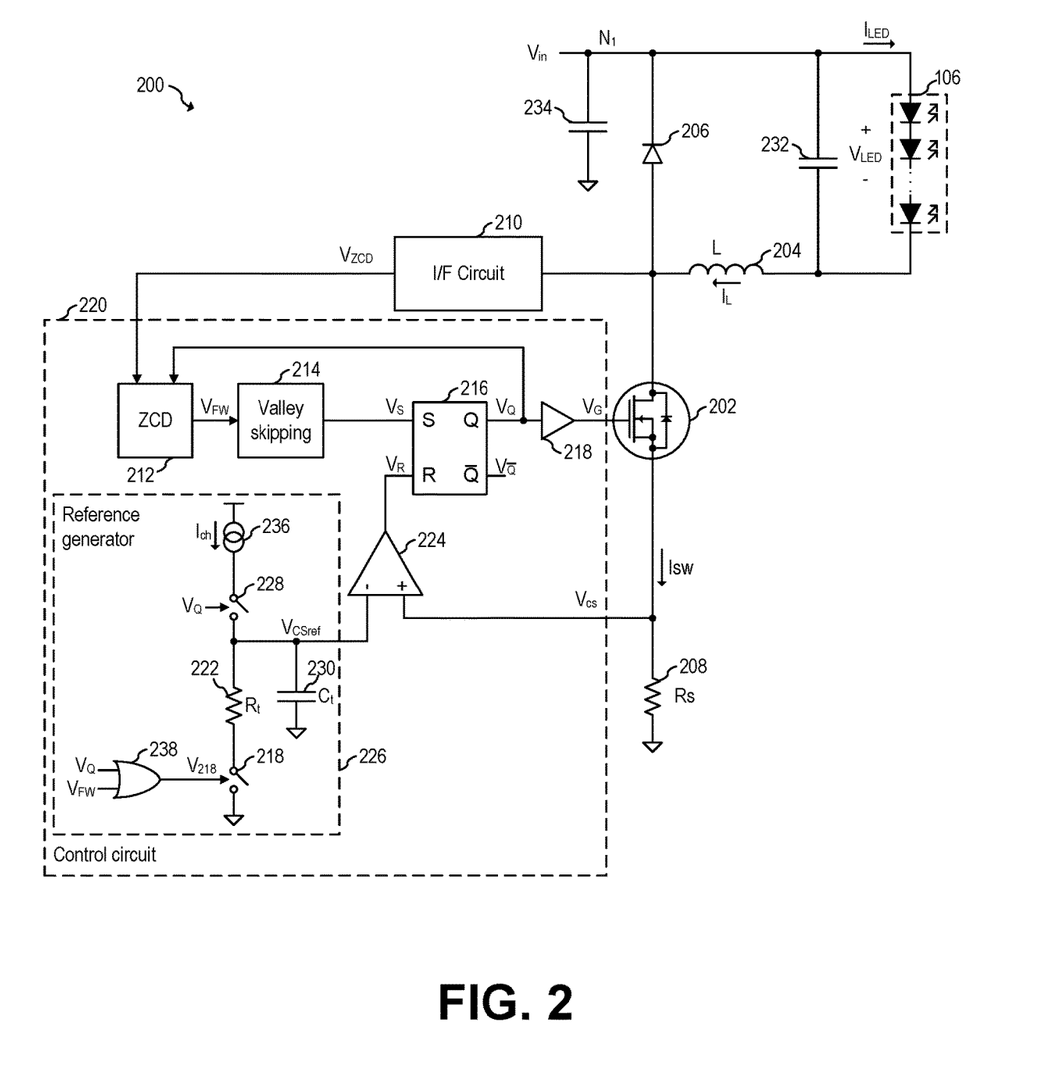
FIG. 2 shows a schematic diagram of a buck converter, according to an embodiment of the present invention.

FIG. 2 shows a schematic diagram of buck converter 200, according to an embodiment of the present invention. Buck converter 200 includes power transistor 202, interface (I/F) circuit 210, sense resistor 208, inductor 204, diode 206, capacitors 232 and 234, and control circuit 220. Control circuit 220 includes zero-current detection (ZCD) circuit 212, gate driver 218, flip-flop 216, valley skipping circuit 214, comparator 224, and reference generator 226. Reference generator 226 includes capacitor 230, switch 218 and 228, resistor 222, OR gate 238, and current generator 236. SMPS 104 may be implemented as buck converter 200 (e.g., where node $N_1$ receives voltage $V_{102}$ as $V_{in}$).

Although LED string 106 is shown as the load driven by buck converter 200, in some embodiments, other loads, instead of or in addition to a LED string, may be driven by buck converter 200. For example, in some embodiments, load 106 may be a rechargeable battery.

As shown in FIG. 2, in some embodiments, power transistor 202 has a source terminal connected to ground, freewheeling diode 206 is connected to node $N_1$, and the load 106 is appended to node $N_1$ in series with inductor 204. Such configuration may advantageously allow for easier driving of transistor 202 compared to driving a floating power switch and allow for having control circuit 220 referred to ground, which may advantageously allow for simplified interfacing with lamp controls such as remote on/off, dimming circuits, etc.

In some embodiments, converter 202 may be operated in QR mode without valley skipping (power transistor 202 is turned on upon the first valley of the drain of power transistor 202 ringing). In QR mode, converter 202 synchronizes the turn-on instant of power transistor 202 to the demagnetization of inductor 204. A delay $T_D$ is introduced to cause the turn-on of power transistor 202 to coincide with the minimum drain-source voltage (valley switching), which may advantageously minimize power losses (e.g., associated with the capacitance of the drain of power transistor 202) and EMI. By operating converter 202 in QR mode, some embodiments advantageously avoid experiencing any reverse recovery of the freewheeling diode 206 (since no current flows through inductor 204 or diode 206 during the turn-on of power transistor 202) and, thus, diode 206 may be implemented with a conventional ultrafast p-n diode. Since some embodiments avoid experiencing any reverse recovery of the freewheeling diode 206, some embodiments are advantageously suitable for high voltage applications (e.g., with input voltage $V_{in}$ higher than 200 V).

In some embodiments, converter 202 may be operated in QR mode with valley skipping (power transistor 202 is turned on upon the kth valley of the drain of power transistor 202 ringing, where k is an integer greater than 1). With valley skipping, delay time $T_D$ is increased so that one or more valleys are skipped, while still turning on power transistor 202 using valley switching after the skipping the valleys that occurred during delay time $T_D$. By operating converter 202 with valley skipping, some embodiments advantageously prevent the switching frequency from getting too high (thereby avoiding the consequent efficiency degradation) while still keeping the benefits of valley switching.

Figure 3:
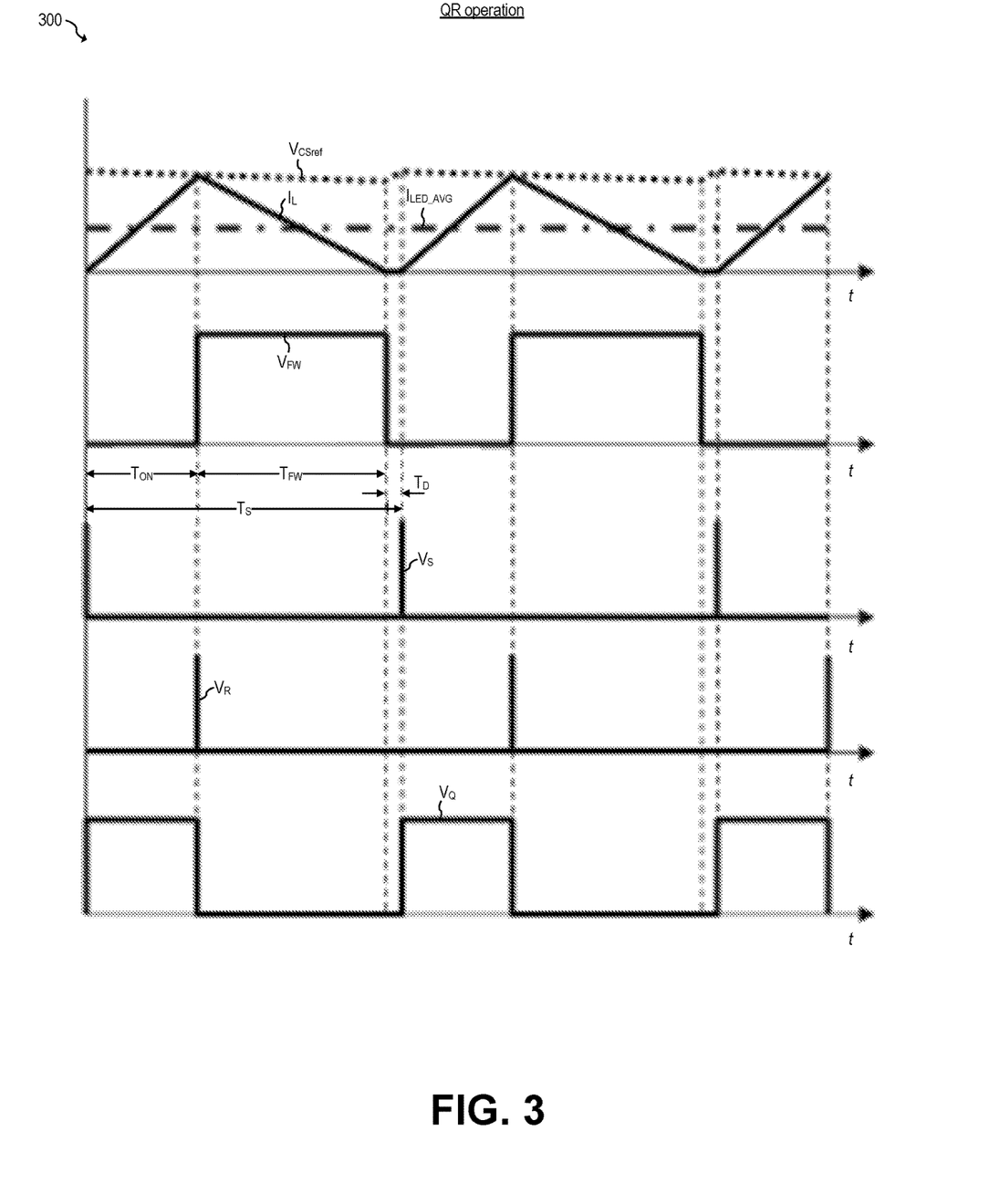
FIGS. 3 and 4 shows waveforms associated with the buck converter of FIG. 2 operating in QR mode without valley skipping or with valley skipping, respectively, according to an embodiment of the present invention.
Figure 4:
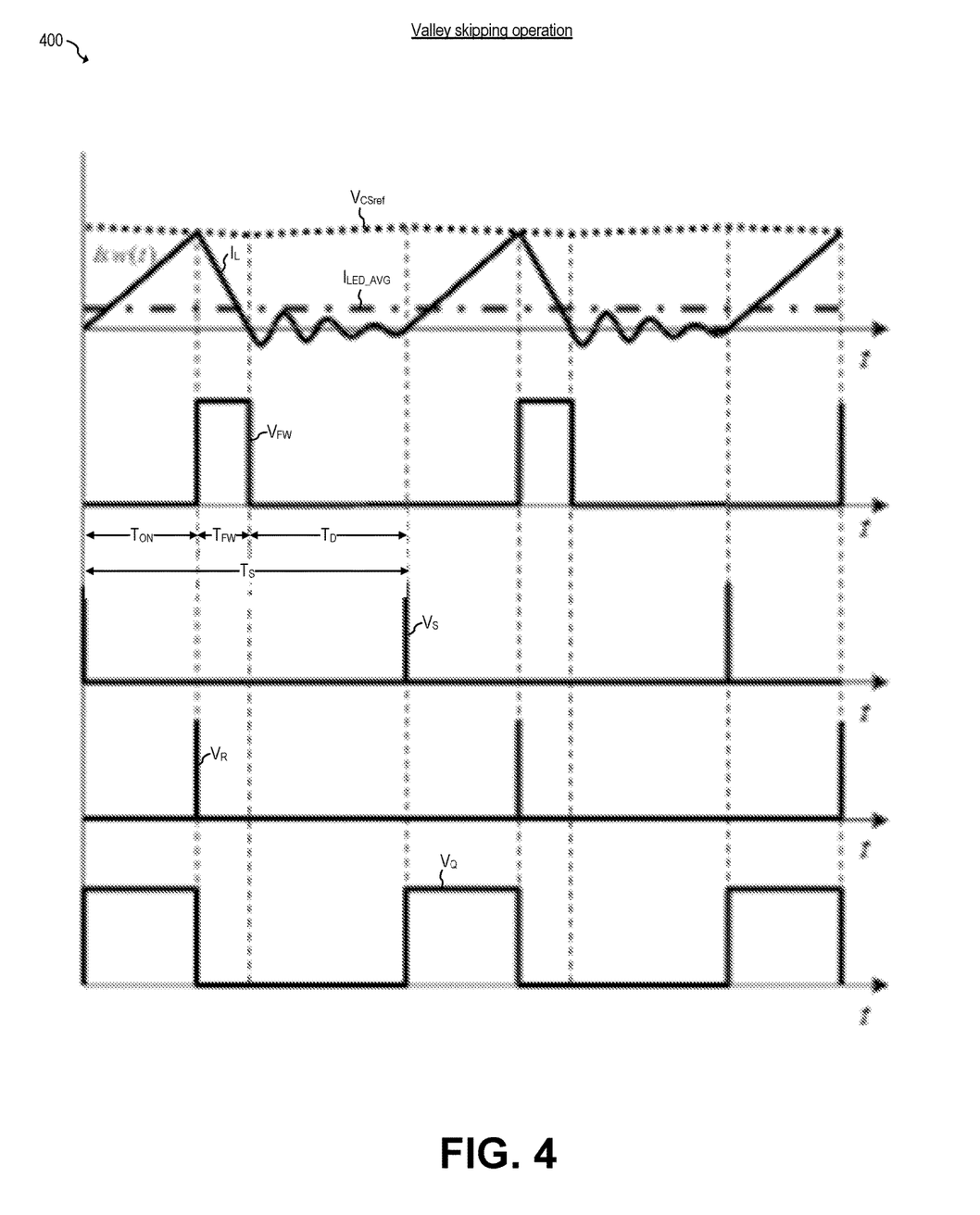

FIG. 3 shows waveforms 30o associated with buck converter 200 operating in QR mode without valley skipping, according to an embodiment of the present invention. FIG. 4 shows waveforms 400 associated with buck converter 200 operating in QR mode with valley skipping mode, according to an embodiment of the present invention. FIGS. 2-4 may be understood together.

During normal operation, the average current $I_{LED}$ delivered to LED string 106 is the average value of the inductor current $I_L(t)$ regardless of the operating mode. Power transistor 202 is turned on when pulses $V_S$ delivered by valley skipping circuit 214 set flip-flop 216. Power transistor 202 is turned off when flip-flop 216 is reset by comparator 224, which trips when voltage $V_{CS}$ is equal to voltage $V_{CSref}$.

As shown in FIG. 2, voltage $V_{CS}$ corresponds to the voltage across resistor 208, and is thus proportional to the portion of the inductor current $I_L$ flowing through power transistor 202. Since current only flows through power transistor 202 when power transistor 202 is on, and since power transistor 202 is turned off when voltage $V_{CS}$ is equal to voltage $V_{CSref}$, the turn-off condition for power transistor 202 can therefore be expressed as:

$$V_{CSref} = V_{CS}(T_{ON}) = Rs \cdot I_{SW}(T_{ON}) = Rs \cdot I_{Lpk} \quad (1)$$

where $T_{ON}$ represents the time in which power transistor 202 is on, Rs represents the resistance of resistor 208, current Isw represents the current flowing through the current path of power transistor 202, $I_{Lpk}$ represents the peak value of inductor current $I_L$.

Reference generator 226 generates reference voltage $V_{CSref}$ by charging capacitor 230 with current $I_{ch}$, via switch 228, and discharging capacitor 230 through resistor 222 via switch 218. Switch 218 is configured (via signal $V_{218}$) to stay closed while inductor current $I_L$ is greater than zero (during the interval $T_{ON}+T_{FW}$) and is open during the remaining part $T_D$ of the switching cycle. Thus, the switching period $T_S$ may be given by $$T_S = T_{ON} + T_{FW} + T_D \quad (2)$$

where $T_{FW}$ represents the demagnetization time from the turning off of power transistor 202 to the current $I_L$ reaching 0 mA, and $T_D$ represents the delay between current IL reaching zero, and the turning on of power transistor 202.

In some embodiments, the time constant $R_t \cdot C_t$ associated with resistor 222 and capacitor 230 is much larger than the switching period $T_S$ (e.g., 10 times larger or more). In some such embodiments (e.g., as illustrated in FIGS. 3 and 4), the voltage $V_{CSref}$ developed across capacitor 230 is substantially constant (a DC voltage) with a small ripple superimposed (e.g., the superimposed ripple may be 5% or less of the average value of voltage $V_{CSref}$). Applying charge balance in a switching cycle to $C_t$, voltage $V_{CSref}$ may be given by $$V_{CSref} = I_{ch} \cdot R_t \cdot \frac{T_S}{T_{ON} + T_{FW}} \quad (3)$$

where $I_{ch}$, represents the current generated by current generator 236, and $R_t$ represents the resistance of resistor 222.

By geometrical reasons, the average inductor current $I_{LED}$ may be given by $$I_{LED} = \frac{1}{2} \cdot I_{Lpk} \cdot \frac{T_{ON} + T_{FW}}{T_S}. \quad (4)$$

Since it follows from Equation 1 that peak inductor current $I_{Lpk}$ may be given by $$I_{Lpk} = \frac{V_{CSref}}{Rs} \quad (5)$$

Then, in view of Equation 4, the average inductor current $I_{LED}$ may be given by $$I_{LED} = \frac{1}{2} \cdot \frac{V_{CSref}}{Rs} \cdot \frac{T_{ON} + T_{FW}}{T_S} \quad (6)$$

which, in view of Equation 3, may be given by $$I_{LED} = \frac{1}{Rs} \cdot \frac{I_{ch} \cdot R_t}{2} \quad (7)$$

In some embodiments, as can be seen in Equation 7, the average current $I_{LED}$, may depend only on resistance Rs (which may be user-selectable) and on internally fixed parameters (e.g., $I_{ch}$, and $R_t$), and does not dependent on voltages $V_{LED}$ or $V_{in}$, or inductance L, or the switching period $T_S$, or the duration of delay time $T_D$. Thus, some embodiments, may operate in QR mode with valley skipping (e.g., where the duration of delay time $T_D$ may be substantial when compared to time $T_S$, as shown in FIG. 4) or without valley skipping (where delay time $T_D$ may be relatively small, such as shown in FIG. 3) while controlling the average current $I_{LED}$ using the same principle (e.g., Equation 7).

In some embodiments, current $I_{ch}$ is generated based on a resistor (not shown) that is matched to $R_t$, thereby advantageously achieving high accuracy of control of average current $I_{LED}$.

Advantages of some embodiments include allowing for accurately controlling output current $I_{LED}$ in QR mode with or without valley skipping while only monitoring current Isw flowing through power transistor 202. Thus, some embodiments advantageously achieve accurately controlling output current $I_{LED}$ in a low-cost, low-complexity manner, and without dissipating excessive energy. For example, some embodiments advantageously avoid using a resistor in series with the inductor for measuring the inductor current $I_L$. In some embodiments, avoiding use of a series resistor for measuring the inductor current may advantageously reduce power dissipation, avoid use of differential sensing with large common-mode dynamics and/or avoid use of a level shifter.

Additional advantages of some embodiments include achieving high output current ($I_{LED}$) accuracy, insensitive to the inductance value L, operating mode (QR mode with or without valley switching), switching period $T_S$, input voltage $V_{in}$, and LED string voltage $V_{LED}$. Some embodiments advantageous allow for accommodating different $V_{LED}$ settings without requiring external calibrations or correction means.

Some embodiments may advantageously limit the operating frequency range of converter 202 by using valley skipping without affecting the accuracy of the average current $I_{LED}$ delivered to the load (e.g., 106). For example, in some embodiments, the switching frequency $F_{SW}$ (where $$F_{SW} = \frac{1}{T_S}$$

) may be varied (e.g., between 130 kHz and 230 kHz) without causing a substantial change in the average current $I_{LED}$ (e.g., variation of less than 1% of the target average current value).

In some embodiments, control circuit 220 is implemented in the same (e.g., monolithic) integrated circuit while elements 202, 204, 206, 208, 210, 232, 234, and 106 are implemented external to the integrated circuit (e.g., so that the integrated circuit may include a demagnetization sensing input for receiving voltage $V_{ZCD}$, e.g., as shown in FIG. 2). Thus, some embodiments advantageously allow a user to accurately control current $I_{LED}$ by changing the resistance value Rs of an external component (208). In some embodiments, elements 206 and 210 are integrated in the same package external to the integrated circuit that includes control circuit 220. In some embodiments, elements 202 and/or 204 may be integrated in the same package external to the integrated circuit that includes control circuit 220.

In some embodiments, the circuits of buck converter 200 may be integrated in a different manner. For example, in some embodiments, interface circuit 210 may be implemented inside the integrated circuit that includes control circuit 220. For example, in some embodiments, elements 202, 204, and/or 210, may be integrated in the same package as elements 212, 214, 216, 218, 222, 224, 228, 230, 236, and 238. In some embodiments, each of elements 106, 202, 204, 206, 208, 210, 212, 214, 216, 218, 222, 223, 228, 230, 236 and 238, may be implemented in a discrete manner. Other implementations are also possible.

In some embodiments, capacitor 234 may be the output capacitor of a previous power stage. For example, in some embodiments, capacitor 108 is connected to node $N_1$, and capacitor 234 may be omitted.

Power transistor 202 may be implemented as a metal-oxide semiconductor field-effect transistor (MOSFET). Power transistor 202 may also be implemented in other ways. For example, in some embodiments, power transistor 202 may be implemented as a gallium nitride (GaN) transistor, or as an insulated-gate bipolar transistor (IGBT).

Interface circuit 210 is configured to generate voltage $V_{ZCD}$ based on current $I_L$ flowing through inductor 204. Voltage $V_{ZCD}$ may be used to sense the demagnetization instant of inductor 204 (e.g., by ZCD circuit 212).

In some embodiments, ZCD 212 is configured to sense the onset of the voltage ringing of the floating terminal of inductor 204 (the drain terminal of power transistor 202) that occurs as current $I_L$ reaches 0 mA and produce a signal $V_{FW}$ indicative of the demagnetization time $T_{FW}$. For example, in some embodiments, ZCD circuit 212 includes a demagnetization sensing input for receiving the voltage $V_{ZCD}$ and generates signal $V_{FW}$ based on voltage $V_{ZCD}$ so that signal $V_{FW}$ is high during the demagnetization period of inductor 204. In some embodiments, ZCD 212 may be implemented in a conventional manner. In some embodiments, ZCD circuit 212 advantageously enables QR operation.

In some embodiments, valley skipping circuit 214 is configured to deliver pulses to set flip-flop 216 based on the negative edge of signals $V_{FW}$ and $V_{ZCD}$. For example, in some embodiments, valley skipping circuit 214 is configured to deliver a pulse to set flip-flop 216 a at the first valley (e.g., as detected by monitoring $V_{ZCD}$) that occurs a time after the inductor current $I_L$ zeros (e.g., as detected by monitoring signal $V_{FW}$) or after subsequent valleys. In some embodiments, valley skipping circuit is configured to deliver a pulse to set flip-flop 216 coinciding with a valley immediately following the expiration of the delay time $T_D$. In some embodiments, valley skipping circuit 214 advantageously allows for limiting the maximum switching frequency $F_{SW}$ with a nominally unaltered control scheme (e.g., as illustrated by Equation 7).

Figure 5:
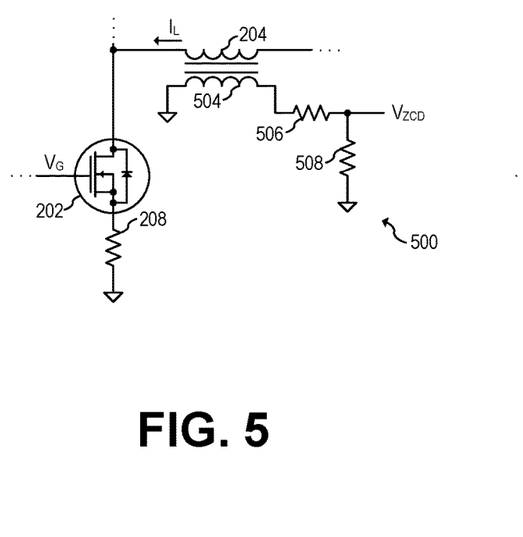
FIGS. 5 and 6 shows schematic diagrams of interface circuits (I/F) of FIG. 2, according to embodiments of the present invention.

FIG. 5 shows a schematic diagram of interface circuit 500, according to an embodiment of the present invention. Interface circuit 210 may be implemented as interface circuit 500. Interface circuit 500 includes auxiliary winding 504 of inductor 204, and resistors 506 and 508 forming a voltage divider.

In some embodiments, auxiliary winding 504 tracks the voltage of the drain terminal of power transistor 202 and has a polarity such that its voltage is negative when power transistor 202 is on (during $T_{ON}$).

As shown in FIG. 5, interface circuit 500 generates voltage $V_{ZCD}$ based on current $I_L$ flowing through inductor 204. Voltage $V_{ZCD}$ may be used to sense the demagnetization instant of inductor 204 (e.g., by ZCD circuit 212).

Figure 6:
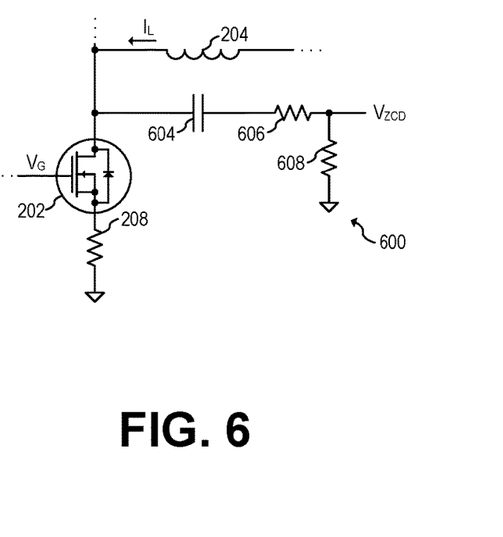

FIG. 6 shows a schematic diagram of interface circuit 600, according to an embodiment of the present invention. Interface circuit 210 may be implemented as interface circuit 600. Interface circuit 600 includes DC blocking capacitor 604 (e.g., connected to the drain terminal of power transistor 202), and resistors 606 and 608 forming a voltage divider. Similarly to interface circuit 500, voltage $V_{ZCD}$ may be used to sense the demagnetization instant of inductor 204 (e.g., by ZCD circuit 212).

Figure 7:
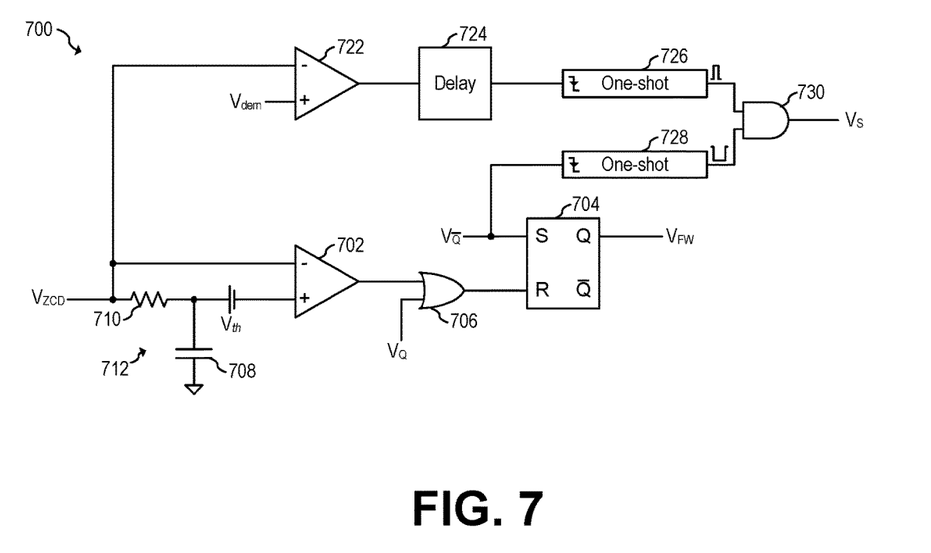
FIG. 7 shows a schematic diagram of a ZCD circuit with valley skipping, according to an embodiment of the present invention.

FIG. 7 shows a schematic diagram of ZCD circuit 700 with valley skipping, according to an embodiment of the present invention. ZCD circuit 212 and valley skipping circuit 214 may be implemented together as ZCD circuit 700. ZCD circuit 700 includes flip-flop 704, comparators 702 and 722, OR gate 706, delay circuit 724, one-shot circuits 726 and 728m AND gate 730, and low-pass filter 712 including resistor 710 and capacitor 708. Low-pass filter 712, and comparator 702 form a negative-derivative detector.

In some embodiments, ZCD circuit 700 may be used to determine the demagnetization time $T_{FW}$ from the turning off of power transistor 202 to the current $I_L$ reaching 0 mA. For example, as shown in FIG. 7, ZCD circuit 500 senses the onset of the voltage ringing of the floating terminal (drain) of power transistor 202 that occurs as inductor current $I_L$ zeroes by monitoring voltage $V_{ZCD}$ (e.g., as generated by interface circuit 500 or 600). Thus, in some embodiments, voltage $V_{FW}$ is reset (e.g., to logic low) when current $I_L$ reaches zero and is set (e.g., to logic high) when power transistor 202 is turned on (e.g., according to signal $V_S$). For example, in some embodiments (e.g., as shown in FIG. 7), since the inverting input of comparator 702 receives voltage $V_{ZCD}$, and the non-inverting input receives voltage $V_{ZCD}$ filtered by low-pass filter 712 and offset downwards by offset $V_t h$, as $V_{ZCD}$ undergoes a negative edge, the output of low-pass filter 712 lags behind, and as their difference exceeds $V_{th}$, comparator 702 triggers, thus resetting flip-flop 704. In some embodiments, offset $V_{th}$ may be a constant offset voltage, such as 25 mV. Other voltages (e.g., higher than 25 mV, such as 30 mV, or higher, or lower than 25 mV, such as 20 mV, or lower, may also be used).

As shown in FIG. 7, signal $V_S$, which sets flip-flop 216, is generated based on the output of comparator 722 and based on a masking time. For example, as shown in FIG. 7, the output of comparator 722 goes high as voltage $V_{ZCD}$ goes below a predetermined threshold $V_{dem}$ (which may be close to 0 V, such as between 50 mV and 300 mV). After a delay inserted by delay circuit 724 (which may be tuned to match the expected quarter period of the drain terminal of power transistor 202 ringing), one-shot circuit 726 produces a pulse intended for setting flip-flop 216.

As power transistor 202 is turned off, signal $V_{\overline{Q}}$ is asserted, which causes one-shot circuit 728 to produce a negative pulse whose duration (masking time) is related to the minimum off time $T_{OFF}$ of power transistor 202 (and thus related to the minimum duration of switching period $T_S$, thus, the maximum switching frequency $F_{SW}$).

As can be seen in FIG. 7, AND gate 730 causes signal $V_S$ to assert (and set flip-flop 216) during the first pulse produced by one-shot 726 after the masking time. Thus, signal $V_{ZCD}$ may ring multiple times and voltage $V_{ZCD}$ may cross threshold $V_{de}m$ multiple times before power transistor 202 is set, thereby resulting in valley skipping.

In some embodiments, one shot circuit 726 is configured to produce a pulse of predetermined duration (e.g., 20 ns)

when the output of delay circuit 724 transitions from high to low. Pulses of different durations (e.g., higher than 20 ns, such as 25 ns, 3o ns, or more, or lower than 20 ns, such as 18 ns, 15 ns, or less) may also be used. One-shot circuit 726 may be implemented in any way known in the art.

In some embodiments, one shot circuit 728 is configured to produce a negative pulse of predetermined duration when signal $V_{\overline{Q}}$ transitions from high to low (or when signal $V_Q$ transitions from low to high). One-shot circuit 728 may be implemented in any way known in the art.

In some embodiments, delay circuit 724 to produce at its output a delayed version of the signal received at its input, where the introduced delay is a predetermined delay. Delay circuit 724 may be implemented in any way known in the art.

Figure 8:
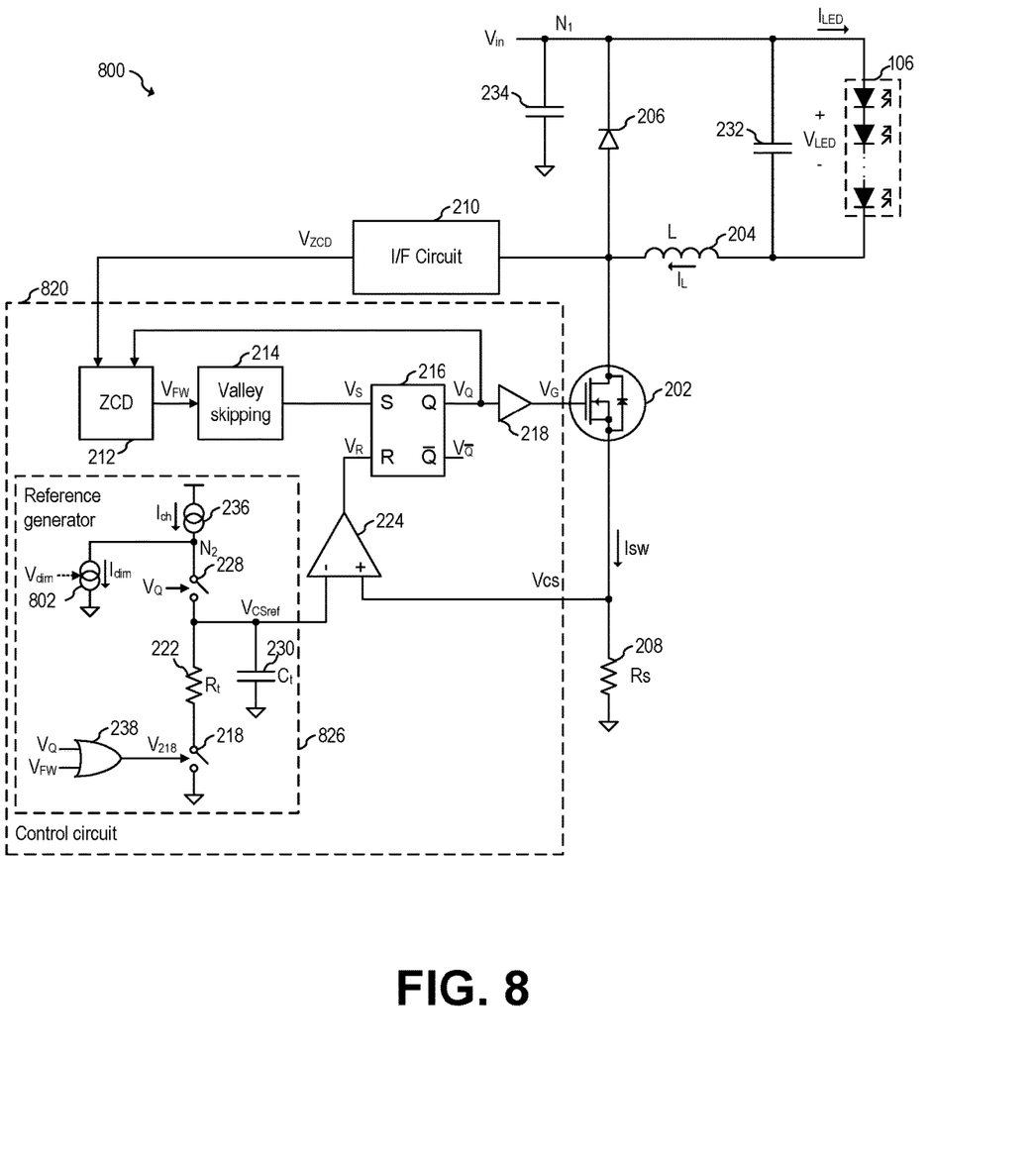
FIG. 8 shows a schematic diagram of a buck converter, according to an embodiment of the present invention.

Some embodiments allow for changing the regulation setpoint of current $I_{LED}$ in a continuous manner (analog dimming). In some embodiments, analog diming is achieved by reducing the current $I_{ch}$. For example, FIG. 8 shows a schematic diagram of buck converter 800, according to an embodiment of the present invention. Buck converter 80o includes power transistor 202, interface (I/F) circuit 210, sense resistor 208, inductor 204, diode 206, capacitors 232 and 234, and control circuit 820. Control circuit 820 includes zero-current detection (ZCD) circuit 212, gate driver 218, flip-flop 216, valley skipping circuit 214, comparator 224, and reference generator 826. Reference generator 826 includes capacitor 230, switch 218 and 228, resistor 222, OR gate 238, and current generators 236 and 802. SMPS 104 may be implemented as buck converter 800 (e.g., where node $N_1$ receives voltage $V_{102}$ as $V_{in}$). Control circuit 220 may be implemented as control circuit 820. Reference generator 226 may be implemented as reference generator 826.

Buck converter 800 operates in a similar manner as buck converter 200. Buck converter 800, however, includes current generator 802, which is configured to sink current from node N2 to reduce the magnitude of current charging capacitor 230 by $I_{dim}$. Thus, in some embodiments, the average current $I_{LED}$ may be given by $$I_{LED} = \frac{1}{Rs} \cdot \frac{(I_{ch} - I_{dim})}{2} \cdot R_t \tag{8}$$

where Lim represents the current generated by current generator 802. As shown by Equation 8, current $I_{LED}$ may be reduced down to zero (by having $I_{dim}$ equal $I_{ch}$). In some embodiments, dimming may be achieved by varying current $I_{ch}$, and omitting current $I_{dim}$.

In some embodiments, current source 802 may be a voltage-controlled current source that generates current Lim based on voltage $V_{dim}$, and where voltage $V_{dim}$ is received, e.g., from an input terminal of the control circuit (e.g., 820).

Looking back to FIG. 2, the propagation delay ΔT from the time in which voltage $V_{CS}$ is equal to $V_{CSref}$, to the time power transistor 202 is turned off may not be insignificant. Delaying turning off power transistor 202 by ΔT may cause current $I_{LED}$ to be larger than predicted by, e.g., Equations 7 or 8. The extra inductor current $I_L$ (generated as a result of the additional time ΔT that power transistor 202 is on) may depend on the applied $V_{in}$-$V_{LED}$, thus, introducing a dependence on both $V_{in}$ and $V_{LED}$. For example, the effect of the progradation delay ΔT on the peak inductor current $I_{Lpk}$ may be given by $$I_{Lpk} = \frac{V_{CSref}}{Rs} + \frac{V_{in} - V_{LED}}{L} \cdot \Delta T \tag{9}$$

and $I_{LED}$ may be given by $$I_{LED} = I_{LEDo} + \frac{V_{IN} - V_{LED}}{2L} \cdot \Delta T \tag{10}$$

where $I_{LEDo}$ represents the average current $I_{LED}$ determined by, e.g., Equation 7.

Figure 9:
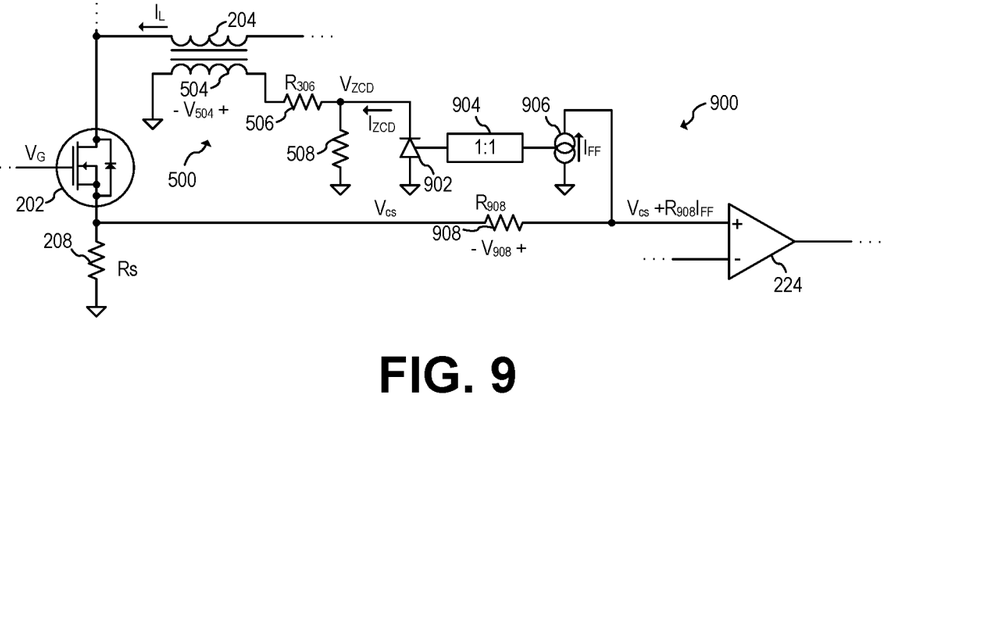
FIGS. 9 and 10 show schematic diagrams of a portion of a control circuit coupled to the interface circuit of FIGS. 5 and 6, respectively, according to embodiments of the present invention.

In some embodiments, voltage feedforward is used to compensate for propagation delay ΔT. For example, in some embodiments, a voltage feedforward circuit may inject a current $I_{FF}$, to be summed with current Isw, based on voltage $V_{ZCD}$ received from interface circuit 210. For example, FIG. 9 shows a schematic diagram of a portion of control circuit 900 coupled to interface circuit 500, according to an embodiment of the present invention. Control circuit 900 includes diode 902, current mirror 904, current source 906, resistor 908, and comparator 224. Control circuit 220 or 820 may be implemented as control circuit 900.

Control circuit 900 operates in a similar manner as control circuit 200. Control circuit 900, however, injects current $I_{FF}$ into the inverting termina of comparator 224.

During the on-time $T_{ON}$ of power transistor 202, the voltage $V_{504}$ across auxiliary winding 504 may be given by $$V_{504} = -\frac{(V_{in} - V_{LED})}{n} \tag{11}$$

where n represents the turn ration between the number of turns of inductor 204 and the number of turns of auxiliary winding 504. Current $I_{ZCD}$ may be given by $$I_{ZCD} = -\frac{(V_{in} - V_{LED})}{n \cdot R_{506}} \tag{12}$$

where $R_{506}$ represents the resistance of resistor 506.

As shown by elements 904 and 906, current $I_{ZCD}$ is mirrored to generate current $I_{FF}$, which causes an offset $V_{908}$ that may be given by $$V_{908} = R_{908} \cdot I_{FF} \tag{13}$$

where $R_{1308}$ represents the resistance of resistor 908. Thus, the inductor peak current $I_{Lpk}$ may be given by $$I_{Lpk} = \frac{V_{CSref} - V_{FF}}{Rs} + \frac{V_{in} - V_{LED}}{L} \cdot \Delta T \tag{14}$$

In some embodiments, $R_{506}$ is selected to be $$R_{506} = \frac{1}{n} \cdot \frac{R_{908} \cdot L}{Rs \cdot \Delta T} \tag{15}$$

to cause voltage $V_{FF}$ to be given by $$V_{FF} = Rs \cdot \frac{V_{in} - V_{LED}}{L} \cdot \Delta T \tag{16}$$

and, therefore, advantageously null the contribution of the propagation delay ΔT on the peak inductor current $I_{Lpk}$ and make $I_{LED}=I_{LEDo}$.

Figure 10:
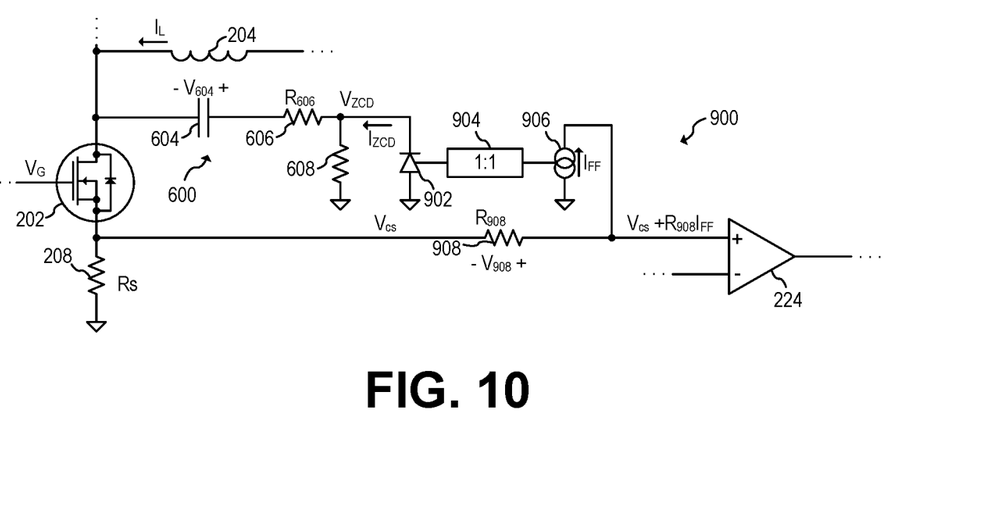

As shown in FIG. 9, interface circuit 210 may be implemented as interface circuit 500. Other implementations are also possible. For example, FIG. 10 shows a schematic diagram of a portion of control circuit 900 coupled to interface circuit 600, according to an embodiment of the present invention.

During the on-time $T_{ON}$ of power transistor 202, the voltage $V_{604}$ across DC blocking capacitor 604 may be given by $$V_{604}=-(V_{in}-V_{LED}) \qquad (17)$$

and current $I_{ZCD}$ may be given by $$I_{ZCD}=-\frac{(V_{in}-V_{LED})}{R_{606}} \qquad (18)$$

where $R_{606}$ represents the resistance of resistor 606.

Equations 13 and 14 similarly apply to the circuit of FIG. 10. In some embodiments, $R_{606}$ is selected to be $$R_{606}=\frac{R_{908}\cdot L}{Rs\cdot \Delta T} \qquad (19)$$

to cause voltage $V_{FF}$ to be given by Equation 16 to cause $I_{LED}$ to be equal to $I_{LEDo}$, and, therefore, advantageously null the contribution of the propagation delay ΔT on the peak inductor current $I_{Lpk}$ and make $I_{LED}=I_{LEDo}$.

Advantages of some embodiments include enabling lighting engineers to design LED lamp drivers that meet market and regulatory requirements with less effort and at a lower cost.

Figure 11:
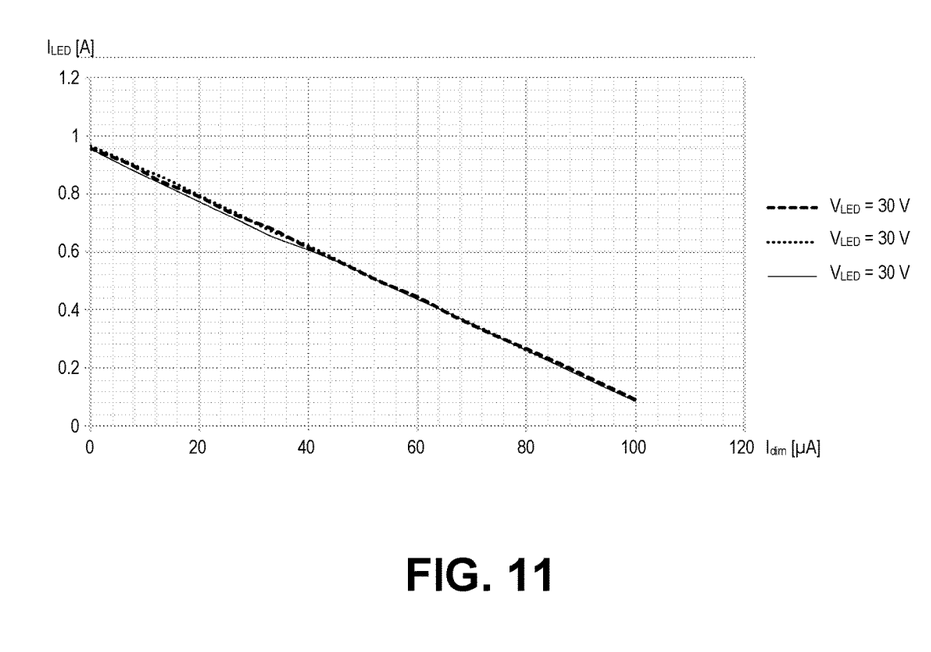
FIGS. 11 and 12 show simulation results associated with the buck converter of FIG. 8, according to an embodiment of the present invention.
Figure 12:
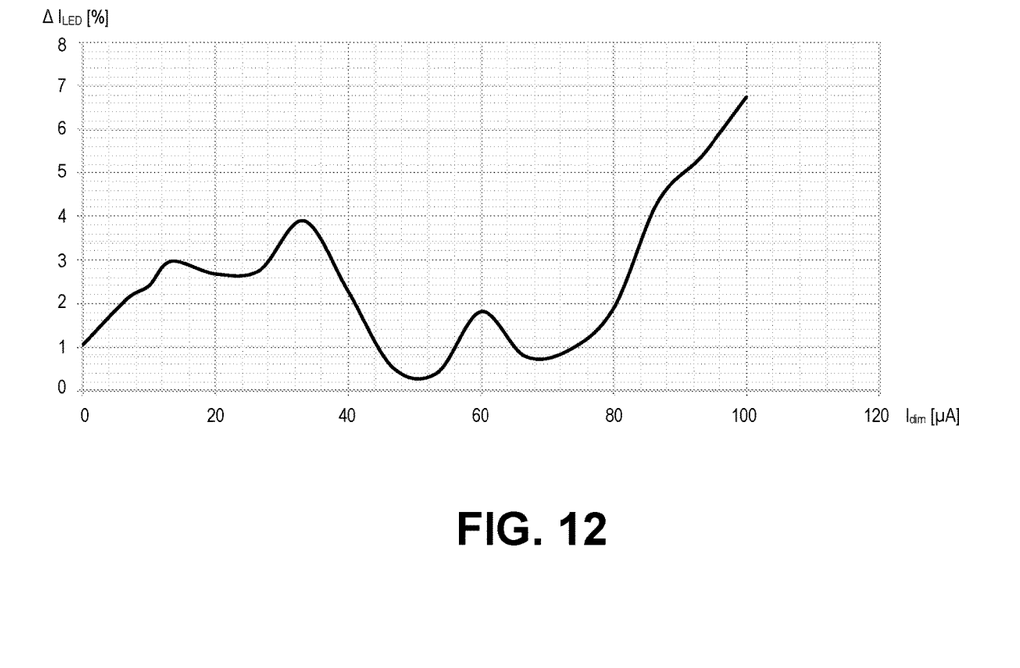

FIGS. 11 and 12 show simulation results associated with buck converter 800, according to an embodiment of the present invention. The simulated buck converter 800 is implemented with the voltage feedforward circuit as shown in FIG. 9. The simulated buck converter 200 is designed to receive a $V_{in}$, between 108 V to 132 V, generate a voltage $V_{LED}$ between 30 V to 90 V, produce an output current $I_{LED}$ of 1 A, and having a diming range between 5% and 100%, where inductor 204 has an inductance L of 50 µH, where output capacitor 232 has a capacitance of 22 µF and where resistor 208 has a sense resistance Rs of 0.2Ω. Other parameters of the simulated buck converter 800 includes current $I_{ch}$, of 1 µA, resistance $R_t$ of 4 MΩ, capacitance of $C_t$ of 50 pF and a dimming gain of 1/100 A/A. Other implementations are also possible.

FIG. 11 illustrates the measured relationship captured by Equation 8 for minimum $V_{LED}$ (30 V) nominal $V_{LED}$ (60 V), and maximum $V_{LED}$ (90 V), in the 5% to 100% range of $I_{LED}$, according to an embodiment. FIG. 12 illustrates the deviation of $I_{LED}$ for the min-to-max variation of $V_{LED}$ in the 5% to 100% range of $I_{LED}$, according to an embodiment. As shown in FIGS. 11 and 12, the relationship between $I_{LED}$ and $I_{dim}$ is very linear, and the sensitivity of $I_{LED}$ versus $V_{LED}$ is low (about 1% of the rated current), which may be advantageous in some embodiments.

Additional advantages of some embodiments include the capability of using valley skipping with QR mode while avoiding the associated discrete steps in the value of $I_{LED}$ and corresponding step changes in the light emission.

Example embodiments of the present invention are summarized here. Other embodiments can also be understood from the entirety of the specification and the claims filed herein.

Example 1. A control circuit including: an output terminal configured to be coupled to a control terminal of a first transistor that has a current path coupled to an inductor; a first logic circuit having an output coupled to the output terminal and configured to control the first transistor using a first signal; a zero crossing detection circuit having a demagnetization sensing input configured to be coupled to the inductor, and a first output coupled to a first input of the first logic circuit, where the zero crossing detection circuit is configured to: generate a freewheeling signal indicative of a demagnetization of the inductor based on the demagnetization sensing input, and cause, with the first output of the zero crossing detection circuit, the first logic circuit to assert the first signal to turn on the first transistor based on the demagnetization sensing input; a first comparator having a first input configured to receive a sense voltage indicative of a current flowing through the current path of the first transistor, a second input configured to receive a first reference voltage, and an output coupled to a second input of the first logic circuit and configured to cause the first logic circuit to deassert the first signal to turn off the first transistor when the sense voltage becomes higher than the first reference voltage; and a reference generator having an output coupled to the second input of the first comparator and configured to generate the first reference voltage at the output of the reference generator, the reference generator including: a first current generator configured to generate a first current, a first capacitor coupled to the output of the reference generator and to the first current generator, a first resistor coupled to the output of the reference generator, and a first switch coupled in series with the first resistor, the first switch configured to be controlled based on the first signal and the freewheeling signal.

Example 2. The control circuit of example 1, where the reference generator further includes a second switch coupled between the first current generator and the output of the reference generator, where the second switch is configured to be controlled based on the first signal.

Example 3. The control circuit of one of examples 1 or 2, where the first input of the first comparator is configured to be coupled to a sense resistor that is coupled in series with the current path of the first transistor.

Example 4. The control circuit of one of examples 1 to 3, where the control circuit is configured to control a current flowing through the inductor by Example 5. The control circuit of one of examples 1 to 4, where the control circuit is configured to change a magnitude of the first current to change a magnitude of the current flowing through the inductor.

Example 6. The control circuit of one of examples 1 to 5, where the reference generator further includes a second current generator configured to subtract a second current from the first current to change a magnitude of the current flowing through the inductor.

Example 7. The control circuit of one of examples 1 to 6, further including an OR gate having a first input configured to receive the first signal, a second input configured to receive the freewheeling signal, and an output coupled to a control terminal of the first switch.

Example 8. The control circuit of one of examples 1 to 7, where the zero crossing detection circuit includes: a second comparator having a first input coupled to the demagnetization sensing input, and a second input coupled to the demagnetization sensing input via a low-pass filter; and a flip-flop having a first input coupled to an output of the second comparator, and an output configured to deliver the freewheeling signal.

Example 9. The control circuit of one of examples 1 to 8, where the zero crossing detection circuit includes: a second comparator having a first input coupled to the demagnetization sensing input, and a second input configured to receive a second reference voltage; a first one-shot circuit having an input coupled to an output of the second comparator; a delay circuit coupled between the output of the second comparator and the input of the first one-shot circuit; a second one-shot circuit having an input configured to receive a second signal, the second signal being an inverted version of the first signal; and a second logic circuit having a first input coupled to an output of the first one-shot circuit, a second input coupled to an output of the second one-shot circuit, and an output coupled to the first output of the zero crossing detection circuit.

Example 10. The control circuit of one of examples 1 to 9, where the zero crossing detection circuit is configured to cause the first logic circuit to assert the first signal at a kth valley occurring after the freewheeling signal is deasserted, where k is a positive integer greater than 1.

Example 11. The control circuit of one of examples 1 to 10, where the first logic circuit includes a flip-flop having a set input coupled to the first output of the zero crossing detection circuit, a reset input coupled to the output of the first comparator, and an output coupled to the output terminal, where the flip-flop is configured to generate the first signal at the output of the flip-flop.

Example 12. The control circuit of one of examples 1 to 11, further including a current mirror configured to be coupled to a first current path terminal of the first transistor via an interface circuit, where the current mirror is configured to inject a first current into the first input of the first comparator based on a current flowing through the interface circuit.

Example 13. The control circuit of one of examples 1 to 12, further including a sense resistor coupled between the first input of the first comparator and ground.

Example 14. The control circuit of one of examples 1 to 13, where the control circuit is integrated in a single integrated circuit.

Example 15. The control circuit of one of examples 1 to 14, further including the first transistor and a gate driver having an input coupled to the output of the first logic circuit, where the first transistor is a power metal-oxide semiconductor field-effect transistor (MOSFET) having a gate coupled to an output of the gate driver.

Example 16. A method for regulating an average output current flowing through an inductor, the method including: generating a demagnetization signal with an interface circuit having an input coupled to a first intermediate node that is coupled between a current path of a power transistor and the inductor; generating a freewheeling signal indicative of a demagnetization of the inductor based on the demagnetization signal; generating a first signal based on the demagnetization signal; turning on the power transistor at a valley of the demagnetization signal occurring after the freewheeling signal is deasserted by using the first signal; receiving a sense voltage indicative of a current flowing through the current path of the power transistor; generating a first reference voltage at a second intermediate node by: generating a first current with a first current generator that is coupled to the second intermediate node, the second intermediate node coupled to a first capacitor and to a first resistor; closing a first switch that is coupled in series with the first resistor when the first signal or the freewheeling signal is asserted, and opening the first switch when the first signal and the freewheeling signal are deasserted; and turning off the power transistor when the sense voltage becomes higher than the first reference voltage, where regulating the average output current includes regulating the average output current based on the first current.

Example 17. The method of example 16, where generating the first reference voltage further includes subtracting a second current from the first current to change a magnitude of the current flowing through the inductor.

Example 18. The method of one of examples 16 or 17, where the average output current is proportional to the first current.

Example 19. A switching converter including: a first supply terminal configured to receive a first voltage; a second supply terminal configured to receive a second voltage lower than the first voltage; a power transistor having a current path coupled between the first and second supply terminals; a sense resistor coupled between the current path of the power transistor and the second supply terminal; an inductor coupled to between the current path of the power transistor and the first supply terminal; a freewheeling diode coupled between the inductor and the first supply terminal; a driver having an output coupled to a control terminal of the power transistor; a flip-flop having a first output coupled to an input of the driver, where the flip-flop is configured to produce a first signal at the first output of the flip-flop; a zero crossing detection circuit having a demagnetization sensing input coupled to the current path of the power transistor and to the inductor, where the zero crossing detection circuit is configured to: generate a freewheeling signal based on a demagnetization of the inductor, and cause the flip-flop to assert the first signal to turn on the power transistor based on the demagnetization sensing input; a first comparator having a first input configured to receive a sense voltage indicative of a current flowing through the current path of the power transistor, a second input configured to receive a first reference voltage, and an output configured to cause the flip-flop to deassert the first signal to turn off the power transistor when the sense voltage becomes higher than the first reference voltage; and a reference generator configured to generate the first reference voltage, the reference generator including: a first current generator configured to generate a first current, a first capacitor coupled to the output of the reference generator and to the first current generator, a first resistor coupled to the output of the reference generator, and a first switch coupled in series with the first resistor, the first switch configured to be controlled based on the first signal and the freewheeling signal, where an average output current flowing through the inductor is proportional to the first current.

Example 20. The switching converter of example 19, further including a light emitting diode (LED) string coupled between the inductor and the first supply terminal.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A control circuit comprising:
an output terminal configured to be coupled to a control terminal of a first transistor that has a current path coupled to an inductor;
a first logic circuit having an output coupled to the output terminal and configured to control the first transistor using a first signal;
a zero crossing detection circuit having a demagnetization sensing input configured to be coupled to the inductor, and a first output coupled to a first input of the first logic circuit, wherein the zero crossing detection circuit is configured to:
generate a freewheeling signal indicative of a demagnetization of the inductor based on the demagnetization sensing input, and
cause, with the first output of the zero crossing detection circuit, the first logic circuit to assert the first signal to turn on the first transistor based on the demagnetization sensing input;
a first comparator having a first input configured to receive a sense voltage indicative of a current flowing through the current path of the first transistor, a second input configured to receive a first reference voltage, and an output coupled to a second input of the first logic circuit and configured to cause the first logic circuit to deassert the first signal to turn off the first transistor when the sense voltage becomes higher than the first reference voltage; and
a reference generator having an output coupled to the second input of the first comparator and configured to generate the first reference voltage at the output of the reference generator, the reference generator comprising:
a first current generator configured to generate a first current,
a first capacitor coupled to the output of the reference generator and to the first current generator,
a first resistor coupled to the output of the reference generator, and
a first switch coupled in series with the first resistor, the first switch configured to be controlled based on the first signal and the freewheeling signal.

2. The control circuit of claim 1, wherein the reference generator further comprises a second switch coupled between the first current generator and the output of the reference generator, wherein the second switch is configured to be controlled based on the first signal.

3. The control circuit of claim 1, wherein the first input of the first comparator is configured to be coupled to a sense resistor that is coupled in series with the current path of the first transistor.

4. The control circuit of claim 3, wherein the control circuit is configured to control a current flowing through the inductor by $$I_{LED} = \frac{1}{Rs} \cdot \frac{I_{ch} \cdot R_t}{2},$$

wherein $I_{LED}$ represents the current flowing through the inductor, Rs represents a resistance of the sense resistor, $I_{ch}$ represents the first current, and $R_t$ represents a resistance of the first resistor.

5. The control circuit of claim 4, wherein the control circuit is configured to change a magnitude of the first current to change a magnitude of the current flowing through the inductor.

6. The control circuit of claim 1, wherein the reference generator further comprises a second current generator configured to subtract a second current from the first current to change a magnitude of the current flowing through the inductor.

7. The control circuit of claim 1, further comprising an OR gate having a first input configured to receive the first signal, a second input configured to receive the freewheeling signal, and an output coupled to a control terminal of the first switch.

8. The control circuit of claim 1, wherein the zero crossing detection circuit comprises:
a second comparator having a first input coupled to the demagnetization sensing input, and a second input coupled to the demagnetization sensing input via a low-pass filter; and
a flip-flop having a first input coupled to an output of the second comparator, and an output configured to deliver the freewheeling signal.

9. The control circuit of claim 1, wherein the zero crossing detection circuit comprises:
a second comparator having a first input coupled to the demagnetization sensing input, and a second input configured to receive a second reference voltage;
a first one-shot circuit having an input coupled to an output of the second comparator;
a delay circuit coupled between the output of the second comparator and the input of the first one-shot circuit;
a second one-shot circuit having an input configured to receive a second signal, the second signal being an inverted version of the first signal; and
a second logic circuit having a first input coupled to an output of the first one-shot circuit, a second input coupled to an output of the second one-shot circuit, and an output coupled to the first output of the zero crossing detection circuit.

10. The control circuit of claim 1, wherein the zero crossing detection circuit is configured to cause the first logic circuit to assert the first signal at a kth valley occurring after the freewheeling signal is deasserted, wherein k is a positive integer greater than 1.

11. The control circuit of claim 1, wherein the first logic circuit comprises a flip-flop having a set input coupled to the first output of the zero crossing detection circuit, a reset input coupled to the output of the first comparator, and an output coupled to the output terminal, wherein the flip-flop is configured to generate the first signal at the output of the flip-flop.

12. The control circuit of claim 1, further comprising a current mirror configured to be coupled to a first current path terminal of the first transistor via an interface circuit, wherein the current mirror is configured to inject a first current into the first input of the first comparator based on a current flowing through the interface circuit.

13. The control circuit of claim 1, further comprising a sense resistor coupled between the first input of the first comparator and ground.

14. The control circuit of claim 1, wherein the control circuit is integrated in a single integrated circuit.

15. The control circuit of claim 1, further comprising the first transistor and a gate driver having an input coupled to the output of the first logic circuit, wherein the first transistor is a power metal-oxide semiconductor field-effect transistor (MOSFET) having a gate coupled to an output of the gate driver.

16. A method for regulating an average output current flowing through an inductor, the method comprising:
generating a demagnetization signal with an interface circuit having an input coupled to a first intermediate node that is coupled between a current path of a power transistor and the inductor;
generating a freewheeling signal indicative of a demagnetization of the inductor based on the demagnetization signal;
generating a first signal based on the demagnetization signal;
turning on the power transistor at a valley of the demagnetization signal occurring after the freewheeling signal is deasserted by using the first signal;
receiving a sense voltage indicative of a current flowing through the current path of the power transistor;
generating a first reference voltage at a second intermediate node by:
generating a first current with a first current generator that is coupled to the second intermediate node, the second intermediate node coupled to a first capacitor and to a first resistor;
closing a first switch that is coupled in series with the first resistor when the first signal or the freewheeling signal is asserted, and
opening the first switch when the first signal and the freewheeling signal are deasserted; and
turning off the power transistor when the sense voltage becomes higher than the first reference voltage, wherein regulating the average output current comprises regulating the average output current based on the first current.

17. The method of claim 16, wherein generating the first reference voltage further comprises subtracting a second current from the first current to change a magnitude of the current flowing through the inductor.

18. The method of claim 16, wherein the average output current is proportional to the first current.

19. A switching converter comprising:
a first supply terminal configured to receive a first voltage;
a second supply terminal configured to receive a second voltage lower than the first voltage;
a power transistor having a current path coupled between the first and second supply terminals;
a sense resistor coupled between the current path of the power transistor and the second supply terminal;
an inductor coupled to between the current path of the power transistor and the first supply terminal;
a freewheeling diode coupled between the inductor and the first supply terminal;
a driver having an output coupled to a control terminal of the power transistor;
a flip-flop having a first output coupled to an input of the driver, wherein the flip-flop is configured to produce a first signal at the first output of the flip-flop;
a zero crossing detection circuit having a demagnetization sensing input coupled to the current path of the power transistor and to the inductor, wherein the zero crossing detection circuit is configured to:
generate a freewheeling signal based on a demagnetization of the inductor, and
cause the flip-flop to assert the first signal to turn on the power transistor based on the demagnetization sensing input;
a first comparator having a first input configured to receive a sense voltage indicative of a current flowing through the current path of the power transistor, a second input configured to receive a first reference voltage, and an output configured to cause the flip-flop to deassert the first signal to turn off the power transistor when the sense voltage becomes higher than the first reference voltage; and
a reference generator configured to generate the first reference voltage, the reference generator comprising:
a first current generator configured to generate a first current,
a first capacitor coupled to the output of the reference generator and to the first current generator,
a first resistor coupled to the output of the reference generator, and
a first switch coupled in series with the first resistor, the first switch configured to be controlled based on the first signal and the freewheeling signal, wherein an average output current flowing through the inductor is proportional to the first current.

20. The switching converter of claim 19, further comprising a light emitting diode (LED) string coupled between the inductor and the first supply terminal.

* * * * *